Feb. 20, 1951     E. A. WESTERFORS     2,542,606
FISH LURE
Filed March 9, 1950
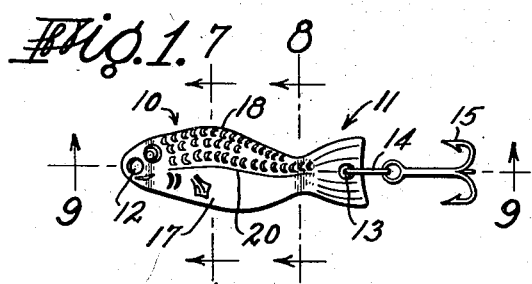
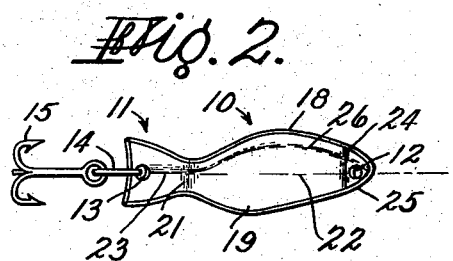
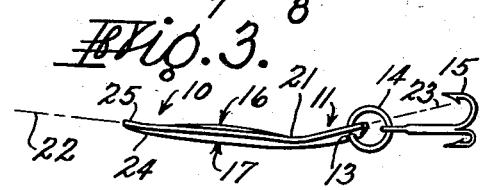
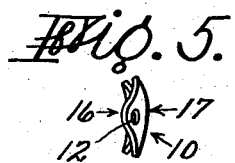
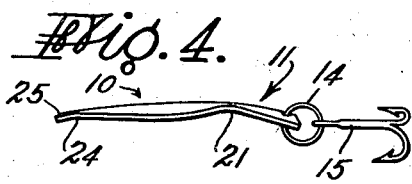
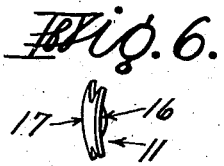
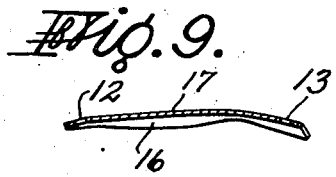
INVENTOR
ERICK ALVAR WESTERFORS
BY Chapin & Neal
ATTORNEYS Patented Feb. 20, 1951

2,542,606

UNITED STATES PATENT OFFICE 2,542,606

FISH LURE

Erick Alvar Westerfors, Westminster, Mass., assignor to Herbert A. Stuart, Indian Orchard, Mass.

Application March 9, 1950, Serial No. 148,697

1 Claim. (Cl. 43—42.5)

This invention relates to fish lures for spinning, trolling or casting.

An object of the invention is to provide a lure designed to closely simulate the shape, appearance and motion of a live swimming minnow.

Another object of the invention is to provide an artificial-fish lure which will move through the water in a manner closely simulating the erratic evasive flight of a small frightened or wounded bait fish.

A further object of the invention is to provide an inexpensive lure which will catch all types of game fish, i. e. fish that will take a shiner or a fly.

A still further object of the invention is to provide a practical, durable and simplified lure, and yet one which will be exceedingly effective for the purpose for which it is designed.

These and other objects and advantages will become apparent from the following description and from the accompanying drawing.

In the drawing:

Fig. 1 is a front view in full scale of a lure embodying my invention;

Fig. 2 is a rear view;

Fig. 3 is a top edge view;

Fig. 4 is a bottom edge view;

Fig. 5 is a front end view;

Fig. 6 is a rear end view;

Fig. 7 is a cross section taken on line 7—7 of Fig. 1;

Fig. 8 is a cross section taken on line 8—8 of Fig. 1; and

Fig. 9 is a longitudinal section on line 9—9 of Fig. 1.

Referring to the drawing, the artificial-fish lure has a body portion 10 and a tail portion 11 with an opening 12 in the nose of the body portion for attachment to the leader of the fishing line, which leader preferably contains a conventional swivel (not shown). Tail portion 11 also has an opening 13 to attach a ring 14 and a multipronged hook 15.

Body portion 10 and tail portion 11 are integral and of hard material such as metal, preferably brass. Markings are provided on one side of the body portion to represent scales, mouth, eye, gills, fins, etc., of a small bait fish or minnow and tail markings on one side of the tail portion.

"Minnow" as used herein refers to any of various small bait fish.

The lure has a series of bends, later to be specifically described, which gives it a generally concave side 16 and a generally convex side 17. The markings mentioned are on the convex side 17.

Body portion 10 is substantially a parallelogram in shape to closely resemble the outline of a live swimming minnow. A minnow swims by undulating its body as well as using its caudal, or tail fin. The body of a minnow when in motion in the water does not have the smooth elliptical shape customarily shown by pictures. Instead body portion 10 appears as shown by Fig. 2 to have a humped back 18 forming an upper corner of a parallelogram and a deep belly 19 forming a lower corner. A curved central body line mark 20 (Fig. 1) adds to the illusion that the artificial minnow is a live, swimming one.

The new lure is given its distinctive motion when pulled through the water largely as a result of water flow against a series of bends in the lure now to be described.

Between the tail portion 11 and body portion 10 is a transverse bend 21 (Fig. 2) disposing the tail portion sharply bent to one side of the body portion, as is best seen in the top plan view of Fig. 3. Tail portion 11 is bent away from the body portion 10 laterally in the direction of the concave side 16 of the lure so that the longitudinal centerline 22 of the body portion is disposed in one plane and the longitudinal centerline 23 of tail portion 11 is disposed in another plane which is at an angle to the plane of the body portion centerline 22.

Another transverse bend 24 is made just to the rear of opening 12 in the body portion to dispose the nose 25 of the body portion at an angle to the body portion and to the same side as the tail portion 11 (Fig. 3).

The body portion 10 and tail portion 11 are bent lengthwise on each side of an arcuate longitudinal bend line as 26 (Fig. 2) to form the generally concave side 16.

The longitudinal bend line 26 begins on the longitudinal centerline 22 of the body at the nose 25 and rises in a shallow arc into the upper part of the body portion, being at its greatest distance from centerline 22 opposite the peak of the humped back 18. Bend line 26 joins the longitudinal centerline 23 of the tail portion 11 at the rear edge of the tail.

This rear edge of tail portion 11 is concavely cut with the hook ring opening 13 closely adjacent the rear edge and on the longitudinal centerline 23 of the tail portion.

In the preferred construction of the device shown, the lure is stamped from sheet brass of about $\frac{1}{16}$" thickness and is about $1\frac{7}{8}$" in length. This results in a lure which needs no extra weight for spinning or trolling. For casting rod use an extra weight on the leader may be added if desired.

The lure is lacquered to preserve it and give it a shiny finish, particularly when made of brass, but luminous or silver paint may be used to provide still further attraction.

Whether the artificial-fish lure is used in trolling or pulled through the water on the line of a fly rod or casting rod, water flow against the bent nose and tail portion tends to impart a wobble motion to the lure and water flow against the longitudinally bent surfaces, over the generally concave and convex sides, tends to impart a fluttering twisting motion. These fluid forces move the artificial minnow in an erratic, rapidly changing, course with a twisting action similar to the evasive maneuvering of a live, injured minnow in frantic flight. This has proven to be a most attractive enticement to game fish.

The size lure shown in the full scale view of Fig. 1 is satisfactory for most game fish, but if larger or smaller than usual fish are to be captured, the lure may be increased or decreased proportionately in size without changing the hydrodynamics involved so long as the bend angles and relative positions are not changed.

Having fully described my invention, I claim:

A fish lure comprising a thin body portion and a thin tail portion with the longitudinal centerline of the body portion disposed in one plane and that of the tail portion disposed in another plane at an angle to said first plane, the nose of the body portion being bent to the same side as the tail portion, said body and tail portions being bent to form a concave surface facing in the same direction as said tail and nose portions and on each side of an arcuate longitudinal bend line extending the length of the lure from the nose of the body portion to the rear edge of the tail portion, said bend line beginning at the nose of the body portion on its longitudinal centerline, arcuately rising into the upper half of the body portion and falling in the rear part of the body portion to terminate on the longitudinal centerline of the tail portion at its rear end, said rear end of the tail portion having a concave rear edge, and the nose of the body portion and the tail portion having openings for a leader swivel and a hook ring attachment respectively.

ERICK ALVAR WESTERFORS.

REFERENCES CITED

The following references are of record in the file of this patent:

UNITED STATES PATENTS

| Number | Name | Date |
|---|---|---|
| 1,669,350 | Sebenius | May 8, 1928 |
| 2,251,593 | Mangle | Aug. 5, 1941 |